United States Patent
Hirukawa

(10) Patent No.: US 12,046,740 B2
(45) Date of Patent: Jul. 23, 2024

(54) METHOD AND APPARATUS FOR PRODUCING AN ELECTRODE FOR NONAQUEOUS ELECTROLYTE SECONDARY BATTERIES

(71) Applicant: Prime Planet Energy & Solutions, Inc., Tokyo (JP)

(72) Inventor: Tomofumi Hirukawa, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/561,874

(22) Filed: Dec. 24, 2021

(65) Prior Publication Data

US 2022/0209212 A1 Jun. 30, 2022

(30) Foreign Application Priority Data

Dec. 28, 2020 (JP) .................................. 2020-218813

(51) Int. Cl.
*H01M 4/04* (2006.01)
*H01M 10/0525* (2010.01)

(52) U.S. Cl.
CPC ....... *H01M 4/0404* (2013.01); *H01M 4/0471* (2013.01); *H01M 10/0525* (2013.01); *H01M 2220/20* (2013.01)

(58) Field of Classification Search
CPC .. H01M 4/0404; H01M 4/0471; H01M 4/043; H01M 4/139; H01M 4/13; H01M 10/0525; H01M 2220/20; H01M 2004/021; Y02E 60/10
See application file for complete search history.

(56) References Cited

U.S. PATENT DOCUMENTS

2012/0282522 A1* 11/2012 Axelbaum ............ H01M 4/525
429/219
2013/0244104 A1 9/2013 Inoue
(Continued)

FOREIGN PATENT DOCUMENTS

CN 103311496 A 9/2013
JP 2000323131 A 11/2000
(Continued)

OTHER PUBLICATIONS

WO-2018066390-A1, machine translation, originally published 2018, p. 1-19 (Year: 2018).*

(Continued)

*Primary Examiner* — Katherine A Bareford
*Assistant Examiner* — Christina D McClure
(74) *Attorney, Agent, or Firm* — HAUPTMAN HAM, LLP

(57) ABSTRACT

The electrode production method disclosed herein has the steps of: preparing an electrode mix paste that contains at least an active material and a solvent; applying the electrode mix paste onto the surface of a collector; and drying a coating film made up of the electrode mix paste applied on the collector. The step of drying includes a residual heat period, a constant rate drying period, and a falling rate drying period. The coating film is pressed at least one time in the falling rate drying period, and the pressing is carried out under conditions such that film thickness of the coating film is not lower than 80% relative to 100% as the film thickness prior to the pressing.

3 Claims, 8 Drawing Sheets

(56) References Cited

U.S. PATENT DOCUMENTS

| | | | | |
|---|---|---|---|---|
| 2014/0014037 | A1* | 1/2014 | Watanabe | H01M 4/0404 |
| | | | | 118/713 |
| 2015/0228982 | A1* | 8/2015 | Shibano | H01G 11/06 |
| | | | | 252/511 |
| 2020/0006732 | A1* | 1/2020 | Yorisaki | H01M 50/44 |
| 2020/0335766 | A1 | 10/2020 | Oh et al. | |
| 2022/0190380 | A1* | 6/2022 | Hirakawa | H01M 4/04 |

FOREIGN PATENT DOCUMENTS

| | | | | |
|---|---|---|---|---|
| JP | 2005186604 | A | 7/2005 | |
| JP | 2013084383 | A | 5/2013 | |
| JP | 2014130751 | A | 7/2014 | |
| JP | 2014203572 | A | 10/2014 | |
| JP | 201546410 | A | 3/2015 | |
| JP | 2015173034 | A | 10/2015 | |
| JP | 2015173035 | A | 10/2015 | |
| JP | 2018195587 | A | 12/2018 | |
| WO | WO-2018066390 | A1 * | 4/2018 | H01M 10/04 |
| WO | WO-2020203421 | A1 * | 10/2020 | H01G 11/06 |

OTHER PUBLICATIONS

Hagiwara, H., JP 2015173034A, machine translation, originally published 2015, p. 1-15 (Year: 2015).*

* cited by examiner

METHOD AND APPARATUS FOR PRODUCING AN ELECTRODE FOR NONAQUEOUS ELECTROLYTE SECONDARY BATTERIES

CROSS REFERENCE TO RELATED APPLICATIONS

The present application claims priority based on Japanese Patent Application No. 2020-218813 filed on Dec. 28, 2020, the entire contents whereof are incorporated in the present specification by reference.

BACKGROUND

1. Technical Field

The present disclosure relates to a method for producing an electrode for nonaqueous electrolyte secondary batteries, and to an electrode production apparatus for producing the electrode.

2. Background

Nonaqueous electrolyte secondary batteries such as lithium ion secondary batteries are smaller, lighter and afford higher energy densities than existing batteries, and accordingly are preferably used as high-output power sources mounted on vehicles, or as power sources in personal computers and mobile terminals. In particular, lithium ion secondary batteries are preferably used as high-output power sources for vehicle drive in for instance battery electric vehicles (BEV), hybrid electric vehicles (HEV) and plug-in hybrid electric vehicles (PHEV).

The electrodes of a nonaqueous electrolyte secondary battery generally have an elongated collector and an electrode mix layer formed on the collector. Such an electrode is typically produced by applying an electrode mix containing an electrode active material and a solvent onto a collector, followed by drying.

Nonaqueous electrolyte secondary batteries are required to deliver yet higher performance; herein one approach for achieving higher performance involves increasing the capacity of the battery. Increasing the capacity of a nonaqueous electrolyte secondary battery may be accomplished for instance by making electrodes thicker than conventional ones.

When an electrode mix (coating film) is thickly applied onto a collector and dried in order to make an electrode thicker, drying shrinkage of the coating film increases, which tends to readily result in wrinkling and cracking in the coating film after drying. The drying period can be ordinarily divided into three periods, namely a residual heat period in which the temperature of the electrode mix (coating film) on the collector is raised up to the evaporation (volatilization) temperature of the solvent, a constant rate drying period in which the temperature of the electrode mix (coating film) is kept constant at the evaporation (volatilization) temperature of the solvent, and a falling rate drying period in which the temperature of the electrode mix (coating film) is raised up to the temperature of a drying oven. In the constant rate drying period, in particular, the solvent evaporates (volatilizes) rapidly, and accordingly the coating film shrinks significantly and tensile stress is likely to residually remain within the coating film. Therefore, Japanese Patent Application Publication No. 2015-046410 discloses a method in which barrel-shaped transport rollers are disposed in the constant rate drying period, to make residual tensile stress unlikelier and thereby reduce the likelihood of material cracking in the electrode mix (coating film) after drying.

SUMMARY

In the method of Japanese Patent Application Publication No. 2015-046410, however, the electrode mix (coating film) is dried in a curved state on account of the barrel-shaped transport rollers, and therefore the electrode mix flows to the edge portions on either side; as a result, an electrode is obtained in which the central portion thereof is thin and both edges are thick (i.e. the film thickness of the electrode is non-uniform). An electrode of non-uniform film thickness may give rise to variability in battery capacity, and reaction unevenness. In consequence, there is a demand for a method of uniformly drying a coating film of thicker film thickness than conventional films, and producing a high-quality electrode in which cracks do not occur after drying.

It is thus an object of the present disclosure, arrived at in view of the above considerations, to provide a method for producing a high-quality electrode the film thickness whereof is kept uniform, and in which the occurrence of cracks is suppressed. It is a further object to provide an electrode production apparatus that is used in such a method for producing an electrode.

In order to attain the above goals there is provided a method for producing an electrode for nonaqueous electrolyte secondary batteries disclosed herein. The production method disclosed herein has steps of: preparing an electrode mix paste that contains at least an active material and a solvent; applying the electrode mix paste onto a collector; and drying a coating film made up of the electrode mix paste applied on the collector. The drying step includes a residual heat period, a constant rate drying period and a falling rate drying period; the residual heat period is a period in which the temperature of the coating film is raised; the constant rate drying period is a period in which the temperature of the coating film is kept constant; and the falling rate drying period is a period in which the temperature of the coating film is raised again after the constant rate drying period. The coating film is pressed at least one time in the falling rate drying period, and the pressing is carried out under conditions such that the film thickness of the coating film is not lower than 80% relative to 100% as the film thickness prior to pressing.

By virtue of such, a configuration a coating film made up of an electrode mix paste is pressed in the falling rate drying period, and accordingly shrinkage forces act in the thickness direction, while shrinkage forces acting on the width direction and the depth direction are suppressed. As a result, also the forces with which the coating film pulls on the collector are suppressed, and bending of the collector is prevented; the coating film can thus be dried uniformly. Also the occurrence of cracks is suppressed thanks to relaxation of the shrinkage forces. That is, it becomes possible to realize production of a high-quality electrode in which the thickness of the coating film is kept uniform, and in which the occurrence of cracks is suppressed.

In a preferred implementation of the production method disclosed herein, the pressing in the falling rate drying period is carried out under conditions such that the film thickness of the coating film is thinned by 0.1% to 10% relative to 100% as the film thickness prior to the pressing.

Such a configuration allows pressing the coating film suitably, even when pressing is carried out during the drying step, and allows producing an electrode the film thickness whereof is kept uniform and in which the occurrence of cracks is suppressed.

In a preferred implementation of the production method disclosed herein, an average film thickness of the coating film at the time of application of the electrode mix paste is from 200 μm to 600 μm.

Such a configuration allows producing an electrode the film thickness whereof is kept uniform and in which the occurrence of cracks is suppressed, also for a coating film of comparatively large average film thickness; as a result, an electrode can be produced in which both higher capacity and higher quality are achieved.

In a preferred implementation of the production method disclosed herein, the pressing is carried out a plurality of times, in the falling rate drying period.

Such a configuration allows performing pressing in accordance with the drying state of the coating film, and accordingly the occurrence of cracks can be suppressed more suitably, and the coating film can be dried in a uniform state.

An electrode production apparatus disclosed herein is provided in order to attain the above other goal. The electrode production apparatus disclosed herein is an electrode production apparatus for producing an electrode that is used in a nonaqueous electrolyte secondary battery that includes an electrode body having a sheet-shaped positive electrode in which a positive electrode mix layer is formed on an elongated positive electrode collector, a sheet-shaped negative electrode in which a negative electrode mix layer is formed on an elongated negative electrode collector, and a nonaqueous electrolyte solution, the apparatus having: a transport unit that transports the elongated collectors; a coating unit that applies an electrode mix paste containing at least an active material and a solvent onto the elongated collector transported by the transport unit; and a drying a coating that dries a coating film made up of the electrode mix paste applied on the collector; the drying unit has, from the upstream side in a transport direction, a residual heat period in which the temperature of the coating film is raised, a constant rate drying period in which the temperature of the coating film is kept constant, and a falling rate drying period in which the temperature of the coating film is raised again after the constant rate drying period; and a pressing device is provided that presses the coating film at least one time in the falling rate drying period, the pressing device being configured to perform pressing under conditions such that the film thickness of the coating film is not lower than 80% relative to 100% as the film thickness prior to the pressing.

Such an electrode production apparatus allows suitably implementing the production method disclosed herein. Specifically, the coating film is pressed by the pressing device in the falling rate drying period, and thus drying shrinkage of the coating film can be suppressed as a result. It becomes therefore possible to realize production of a high-quality electrode in which the thickness of the coating film (electrode) after drying is kept uniform, and in which the occurrence of cracks is suppressed.

In a preferred implementation of the production apparatus disclosed herein, the pressing device performs pressing under conditions such that the film thickness of the coating film is thinned by 0.1% to 10% relative to 100% as the film thickness prior to the pressing.

By virtue of such a configuration the coating film is suitably pressed, without adhering to the pressing device, even when the coating film is pressed by the pressing device in the falling rate drying period.

In a preferred implementation of the production apparatus disclosed herein, an average transport speed in the falling rate drying period is from 0.5 m/min to 100 m/min.

Such a configuration allows properly controlling the transport speed of the collector (typically an elongated sheet-shaped collector) on which the coating film is applied. Therefore, the drying time of the coating film can be easily optimized in each period. This allows further suppressing the occurrence of cracks.

In a preferred implementation of the production apparatus disclosed herein, the pressing device is provided as a plurality thereof in the transport direction, in the falling rate drying period.

Such a configuration allows pressing the coating film at a yet more suitable timing, and further curtailing the occurrence of cracks.

BRIEF DESCRIPTION OF THE DRAWINGS

FIG. 2A depicts a state before drying, FIG. 2B depicts a state in a constant rate drying period, FIG. 2C depicts a state in a falling rate drying period, and FIG. 2D depicts a state after drying;

FIG. 3A depicts a state before drying, FIG. 3B depicts a state in a constant rate drying period, FIG. 3C depicts a state in a falling rate drying period, and FIG. 3D depicts a state after drying;

DETAILED DESCRIPTION

Figure 1:
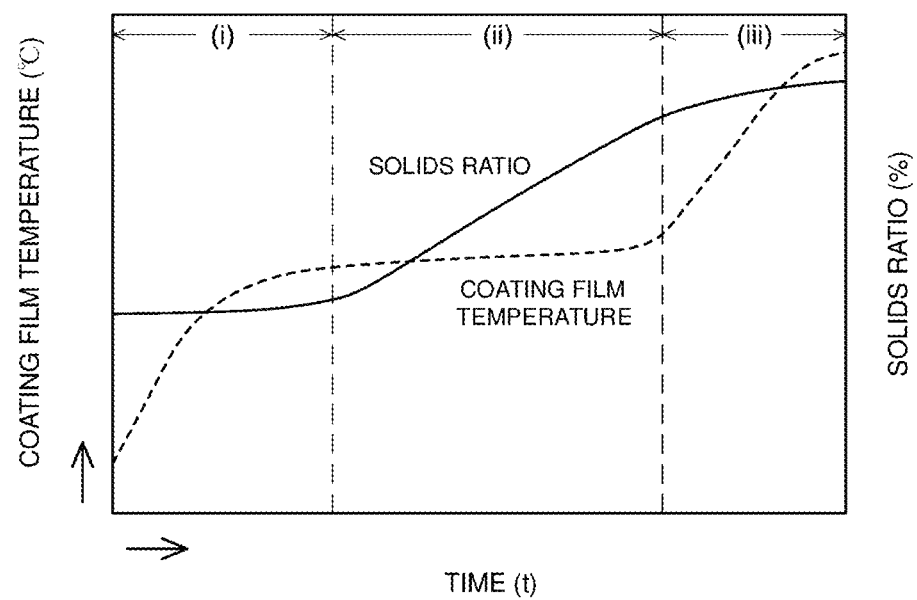
FIG. 1 is a graph illustrating schematically the change over time of solids ratio in a coating film and coating film temperature.

Preferred embodiments of the present disclosure will be explained below with reference to accompanying drawings. Needless to say, the embodiments explained herein are not meant to particularly limit the present disclosure. Any features (for instance general production processes in electrode production methods, and the general configuration of a nonaqueous electrolyte secondary battery, and which are not characterizing features of the present disclosure) other than the matter specifically set forth in the present specification and that may be necessary for carrying out the present disclosure can be regarded as design matter for a person skilled in the art based on conventional art in the relevant field. The present disclosure can be realized on the basis of the disclosure of the present specification and common technical knowledge in the relevant field. The reference symbol X in the figure represents a "width direction" and the reference symbol Z represents a "thickness direction". Dimensional relationships (for instance length, width and thickness) do not reflect actual dimensional relationships.

In the present specification a notation "A to B (where A and B are arbitrary numerical values)" for denoting a range signifies values equal to or larger than A and equal to or smaller than B.

In the present specification the term "secondary battery" denotes a power storage device in general capable of being repeatedly charged, and encompasses so-called storage batteries (i.e. chemical batteries) such as lithium ion secondary batteries, nickel metal hydride batteries and nickel cadmium batteries, as well as electrical double layer capacitors (i.e. physical batteries). The term "nonaqueous electrolyte secondary battery" in the present specification denotes a power storage device in general capable of being repeatedly charged and that utilizes a nonaqueous electrolyte solution, and encompasses power storage elements such as so-called storage batteries and electrical double layer capacitors. In the present specification the term "lithium ion secondary battery" denotes a nonaqueous electrolyte secondary battery in which lithium ions are utilized as charge carriers, and in which charge and discharge are realized through movement of charge with lithium ions between a positive electrode and a negative electrode.

Method for Producing an Electrode

The method for producing an electrode for nonaqueous electrolyte secondary batteries disclosed herein roughly includes the three steps below: (1) a step of preparing an electrode mix paste; (2) a step of applying the electrode mix paste; and (3) a step of drying a coating film made up of the electrode mix paste. The step (3) of drying a coating film made up of the electrode mix paste is characterized by including three periods, namely (i) a residual heat period, (ii) a constant rate drying period and (iii) a falling rate drying period, the coating film being pressed in the falling rate drying period (iii). Therefore, other steps are not particularly limited, and configurations identical to those of conventional production methods of this type may be adopted herein. In the present specification the term "period" may also be read as "stage". There is moreover no impediment for the method to include other arbitrary stages, in addition to those above. Each step will be explained hereafter.

Step of Preparing an Electrode Mix Paste

In the electrode mix paste preparation step a paste is prepared by mixing at least an electrode active material and a solvent. In the present specification the language "paste" is used as a term encompassing forms that are referred to as "slurry" and "ink".

Materials that are used as materials of pastes in conventional nonaqueous electrolyte secondary batteries, in particular lithium ion secondary batteries, may be used herein as the material of the electrode mix paste. A lithium complex oxide or a lithium-transition metal phosphate compound (for instance $LiFePO_4$) can be preferably used as the positive electrode active material, to prepare a positive electrode mix paste. Examples of lithium complex oxides include lithium-nickel complex oxides, lithium-cobalt complex oxides, lithium-manganese complex oxides, lithium-nickel-manganese complex oxides (for instance $LiNi_{0.5}Mn_{1.5}O_4$) and lithium-nickel-manganese-cobalt complex oxides (for instance $LiNi_{1/3}Co_{1/3}Mn_{1/3}O_2$).

The average particle size of the positive electrode active material is not particularly limited, and is about 30 μm or less (typically, from 1 μm to 20 μm, for instance from 5 μm to 15 μm). In the present specification the term "average particle size" denotes a particle size ($D_{50}$; hereafter also referred to as median size) corresponding to a cumulative frequency of 50 vol % from a small-size fine particle side in a volume-basis particle size distribution based on a general laser diffraction/light scattering method.

Preferred examples of the solvent contained in the positive electrode mix paste and that can be used include for instance N-methyl-2-pyrrolidone (NMP).

The positive electrode mix paste may contain, as a solid component, substances other than the positive electrode active material for instance a conductive material and a binder. For instance carbon black such as acetylene black (AB) or some other carbon material (graphite or the like) can be preferably used as the conductive material. For instance a fluorine-based binder such as polyvinylidene fluoride (PVdF) or polytetrafluoroethylene (PTFE), or a rubber-based binder such as styrene-butadiene rubber (SBR), can be preferably used as the binder. Further, the positive electrode mix paste may contain materials (for instance various additives) other than those described above, so long as the effect of the present disclosure is not impaired thereby.

In the present specification the term "solid component" denotes the material (solid material) in each respective material described above excluding the solvent, and the term "solids ratio" denotes the proportion of the solid component in the electrode mix paste resulting from mixing all the materials.

To prepare a negative electrode mix paste, a carbon material such as graphite, hard carbon or soft carbon can be preferably used as the negative electrode active material. Graphite may be herein natural graphite or man-made graphite. Also amorphous carbon-coated graphite in which the surface of graphite is coated with an amorphous carbon film may be used herein.

The average particle size of the negative electrode active material is not particularly limited, and is about 30 μm or less (typically, from 1 μm to 20 μm, for instance from 5 μm to 15 μm).

Preferably an aqueous solvent or the like can be used as an example of the solvent contained in the negative electrode mix paste. The aqueous solvent is water or a mixed solvent having water as a main component.

The negative electrode mix paste may contain, as a solid component, substances other than the negative electrode active material, for instance a thickener and a binder. For instance styrene-butadiene rubber (SBR) or the like can be preferably used as the binder. For instance carboxymethyl cellulose (CMC) or methyl cellulose (MC) can be preferably used as the thickener. The negative electrode mix paste may contain materials (for instance various additives) other than those described above, so long as the effect of the present disclosure is not impaired thereby.

The solids ratio of each electrode mix paste is not particularly limited, so long as the paste can be applied stably, but for instance is preferably from 30 mass % to 80 mass %, more preferably from 35 mass % to 75 mass %, and yet more preferably from 40 mass % to 70 mass %.

From the viewpoint of energy density, the proportion of the electrode active material in the total solid component of the electrode mix paste is preferably about 50 mass % or higher, more preferably for instance from 80 mass % to 99 mass % and yet more preferably from 85 mass % to 95 mass %. The proportion of the binder in the total solid component of the electrode mix paste is preferably for instance from 0.1 mass % to 15 mass %, more preferably from 1 mass % to 10 mass %. In a case where various additives such as a thickener are incorporated, the proportion of the additives in the total solid component of the paste is preferably for instance 7 mass % or lower, more preferably 5 mass % or lower.

Each electrode mix paste can be prepared by mixing the above-described materials such as the electrode active material, the solvent and other additives, using a conventionally known mixing device. Examples of such a mixing device include ball mills, roll mills, kneaders and homogenizers. The order in which the above materials are mixed is not particularly limited, and for instance the totality of the materials may be added to the solvent all at a time, or divisionally over a plurality of additions.

Step of Applying the Electrode Mix Paste

Each electrode mix paste can be applied, onto a respective collector, using a conventionally known coating device. Examples of such coating devices include gravure coaters, comma coaters, slit coaters and die coaters.

Metal-made collectors can be used, without particular limitations, as the collectors of this type of batteries. The positive electrode collector on which the positive electrode mix paste is applied is for instance made up of a metallic material of good conductivity, such as aluminum, nickel, titanium or stainless steel. Aluminum (for instance an aluminum foil) is particularly preferred herein. The thickness of the positive electrode collector is not particularly limited, and is from about 5 µm to 30 µm, preferably from 10 µm to 20 µm.

The negative electrode collector on which the negative electrode mix paste is applied is for instance made up of a metallic material of good conductivity, such as copper or an alloy having copper as a main component, or nickel, titanium or stainless steel. Copper (for instance a copper foil) is particularly preferred herein. The thickness of the negative electrode collector is not particularly limited, and is from about 5 µm to 20 µm, preferably from 8 µm to 15 µm.

The average thickness of the coating film at the time of application onto the collector is set to be thicker than in conventional instances; from the viewpoint of increasing the capacity of the battery, the average thickness of the coating film is required herein to be 200 µm or larger. For instance the average film thickness is preferably 250 µm or larger, more preferably 300 µm or larger. Drying time becomes excessively long in a case where the average thickness of the coating film is too large; accordingly, the upper limit of the average thickness of the coating film is preferably for instance 600 µm or less, more preferably 550 µm or less. Cracks occur readily in the falling rate drying period in a case where the average thickness of the coating film is larger than in conventional instances. The effect of the present disclosure can be better brought out as a result.

Step of Drying the Coating Film

Figure 2A:
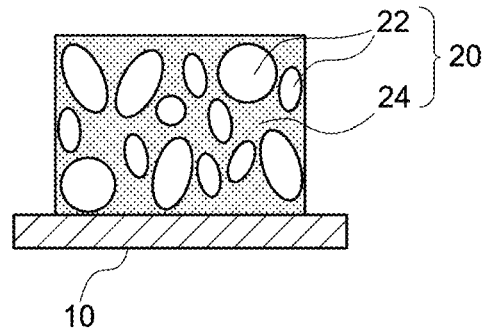
FIGS. 2A to 2D are sets of diagrams illustrating schematically a drying step of a coating film in a conventional method, where
Figure 2B:
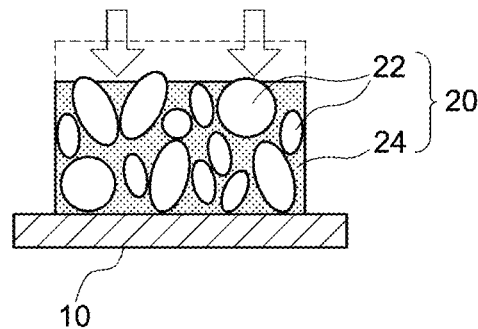
Figure 2C:
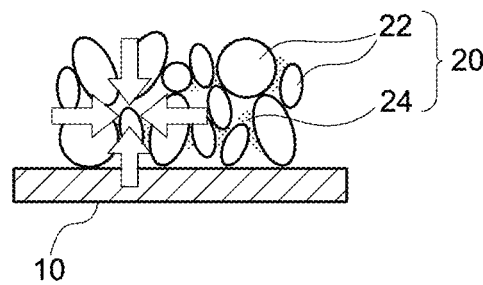
Figure 2D:
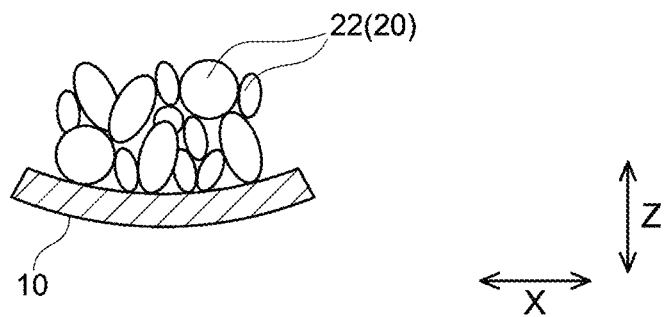
Figure 3A:
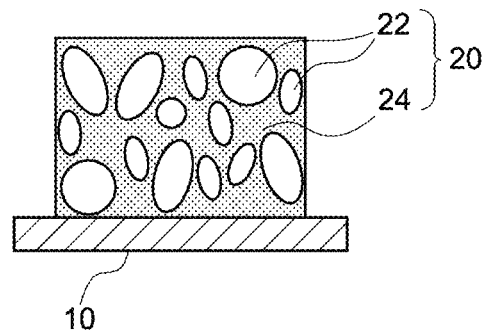
FIGS. 3A to 3D are sets of diagrams illustrating schematically a drying step of a coating film according to an embodiment, where
Figure 3B:
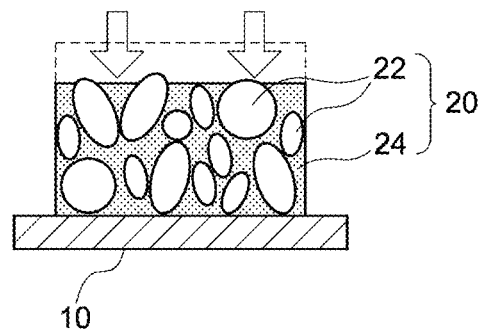
Figure 3C:
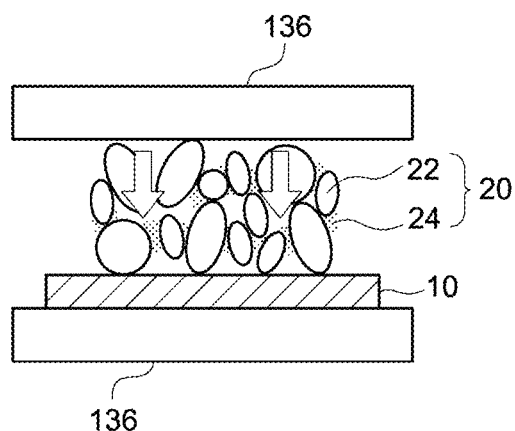
Figure 3D:
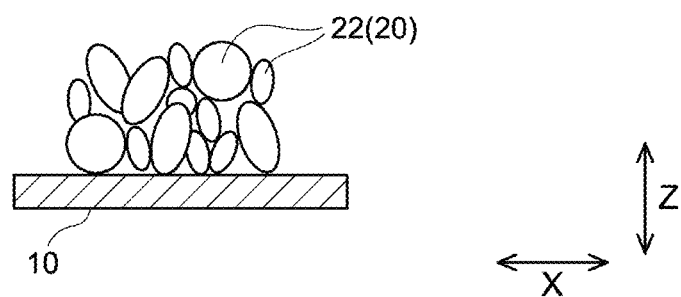

The drying step is a step of removing the solvent through drying of the coating film, to thereby form an electrode mix layer. FIG. 1 is a diagram illustrating schematically the change over time of coating film temperature and coating film solids ratio in a general drying step. FIGS. 2A to 2D and 3A to 3D are diagrams illustrating schematically a process of drying a coating film 20 immediately following application onto a collector 10, to evaporate (volatilize) a solvent 24. In FIGS. 2A to 2D and 3A to 3D, FIGS. 2A and 3A depict a state before drying, FIGS. 2B and 3B depict a state in a constant rate drying period, FIGS. 2C and 3C depict a state in a falling rate drying period, and FIGS. 2D and 3D depict a state after drying. The paste drying step according to an embodiment will be explained next with reference to FIGS. 1, 2A to 2D, and 3A to 3D.

In a case where a coating film 20 made of an electrode mix paste containing a solvent is dried by being placed in a drying oven in a steady state, the drying step is roughly divided in three periods (stages), as illustrated in FIG. 1, depending on the change in the temperature of the coating film. Period (i) is a "residual heat period" in which the coating film temperature is raised substantially linearly up to the evaporation temperature (volatilization temperature) of the solvent. Period (ii) is a "constant rate drying period" in which the coating film temperature is kept constant at the evaporation temperature (volatilization temperature) of the solvent. Period (iii) is a "falling rate drying period", in which the coating film temperature is raised again after the constant rate drying period.

(i) Residual Heat Period

The residual heat period is a period in which the coating film temperature of the coating film 20, typically in a room temperature environment, is raised up to the evaporation (volatilization) temperature of the solvent 24. At this time the solid material 22 mainly made up of an electrode active material and a binder is in a dispersed state within the solvent. (i) In the residual heat period the coating film temperature does not reach the evaporation temperature of the solvent 24, and accordingly virtually no solvent evaporates. Therefore, also the solids ratio of the coating film 20 is kept substantially constant. The solids ratio at this time varies depending on the solid material 22 and the solvent 24 contained in the coating film 20, and accordingly is not particularly limited, but is typically from 30 mass % to 60 mass % (for instance from 45 mass % to 55 mass %).

(ii) Constant Rate Drying Period

The constant rate drying period is a period in which the coating film temperature is kept constant at the evaporation temperature (volatilization temperature) of the solvent 24. (ii) In the constant rate drying period the coating film temperature reaches the evaporation temperature of the solvent 24, and accordingly the solvent 24 evaporates from the coating film surface, as illustrated in FIG. 2B. As a result of evaporation of the solvent 24 from the coating film 20, forces act on the coating film 20 so as to elicit shrinking in the direction denoted by the arrows in FIG. 2B. The solids ratio of the coating film 20 increases due to evaporation of the solvent 24 from the coating film 20. The solids ratio increases substantially linearly in proportion to time, as illustrated in FIG. 1. The solids ratio at this time changes rapidly and, although not categorically so, typically lies in the range from 40 mass % to 70 mass % (for instance from 55 mass % to 65 mass %).

(iii) Falling Rate Drying Period

The falling rate drying period is a period at which the coating film temperature having been kept constant at the constant rate drying period (ii) is raised again up to the temperature of the drying oven. The state of the coating film 20 in the falling rate drying period (iii) is typically a state in which the solvent 24 present in the vicinity of the surface of the coating film 20 has virtually evaporated, and the solvent 24 present between particles of the solid material 22 that make up the coating film 20 is evaporating. At this time, forces act on the coating film 20 so that particles of the solid material 22 shrink onto each other in the directions denoted by the arrows in FIG. 2C. As a result, also the collector 10 is pulled by the forces that underlie shrinking of the coating film 20, and as a result the central portion of the collector 10 becomes concavely curved, as illustrated in FIG. 2D. These shrinkage forces remain in the interior of the coating film 20, and give rise to cracks in the coating film 20, for instance from voids in the coating film 20. In FIG. 2C the shrinkage direction of the solid material 22 is illustrated two-dimensionally, but this is done for the purpose of depicting FIG. 2C as a schematic plan-view diagram; in actuality, the solid material 22 is acted upon by shrinkage forces in three-dimensional directions.

As illustrated in FIG. 1, the solids ratio of the coating film 20 increases more gently than in the constant rate drying period (ii). The solids ratio at this time varies depending on the solid material 22 and the solvent 24 contained in the coating film 20, and accordingly is not particularly limited, but is typically from 60 mass % to 95 mass % (for instance from 75 mass % to 90 mass %). A coating film 20 having a solids ratio within such a range can be suitably pressed without adhesion of the coating film 20 to the pressing device.

In the production method disclosed herein, pressing is performed in the falling rate drying period (iii), as illustrated in FIG. 3C. In the case of pressing in the falling rate drying period (iii), shrinkage forces act only in the downward direction, as indicated by the arrows, and shrinkage forces in the solid material 22 in the X direction are relaxed. As a result, the coating film 20 can be dried in a uniform state without concave curving of the central portion of the collector 10, illustrated in FIG. 3D. An electrode of uniform film thickness can be achieved as a result. Moreover, shrinkage forces in the interior of the coating film 20 are relaxed, and the occurrence of cracks can be suppressed. That is, by performing pressing in the falling rate drying period it becomes possible to realize production of a high-quality electrode in which cracking is suppressed and film thickness is preserved uniformly.

The drying method in the drying step is not particularly limited, so long as it is a method that includes the three periods described above. Examples thereof include known methods such as hot air drying and infrared drying.

The drying temperature (temperature within the drying oven) in the drying step varies depending for instance on the type of the solvent 24 that is utilized, and is for instance set to 50° C. or higher, typically 70° C. or higher, and preferably 100° C. or higher. In particular the drying temperature may be set to 120° C. or higher, for instance 140° C. or higher, in a case where a solvent (for instance an aqueous solvent) having a comparatively high boiling point is used. The upper limit of the drying temperature is not particularly restricted, but is preferably set for instance to 200° C. or less, typically 190° C. or less, and further to 180° C. or less, from the viewpoint of reducing production costs.

Pressing conditions in the falling rate drying period require pressing such that the thickness of the coating film 20 after pressing is not lower than 80% relative to 100% as the thickness of the coating film 20 prior to pressing. Typically, pressing is carried out under conditions that yield thinning from 0.1% to 15%, more preferably for instance under conditions that yield thinning from 0.1% to 10%, and yet more preferably under conditions that yield thinning from 0.5% to 8%. Within such ranges of pressing conditions, an electrode of uniform film thickness can be produced, without application of excessive pressing pressure to the coating film 20; also, an electrode is obtained in which the occurrence of cracks is suppressed.

The transport speed in the falling rate drying period is not particularly limited, but typically is preferably set to 0.1 m/min or higher, from the viewpoint of improving productivity. Preferably, the transport speed in the falling rate drying period is set to 0.3 m/min or higher, and more preferably to 0.5 m/min or higher. If the drying speed is excessively high, cracks are likely to occur in the coating film 20; typically, therefore, the drying speed is preferably set to 100 m/min or lower. Preferably, the drying speed is set to 90 m/min or lower, and more preferably to 80 m/min or lower.

After the drying step, a pressing step may be performed with a view to adjusting the basis weight and density of the electrode mix layer. Such a pressing step can be carried out according to a conventionally known method, using a roll press or the like. The pressing step as referred to herein denotes a pressing step that is carried out under conditions (for instance linear pressure of 10 kN/cm or higher at the time of roll pressing) such that the resulting thickness of the electrode mix layer is about 70% or less relative to 100% as the thickness prior to the pressing step.

Electrode Production Apparatus

Figure 4:
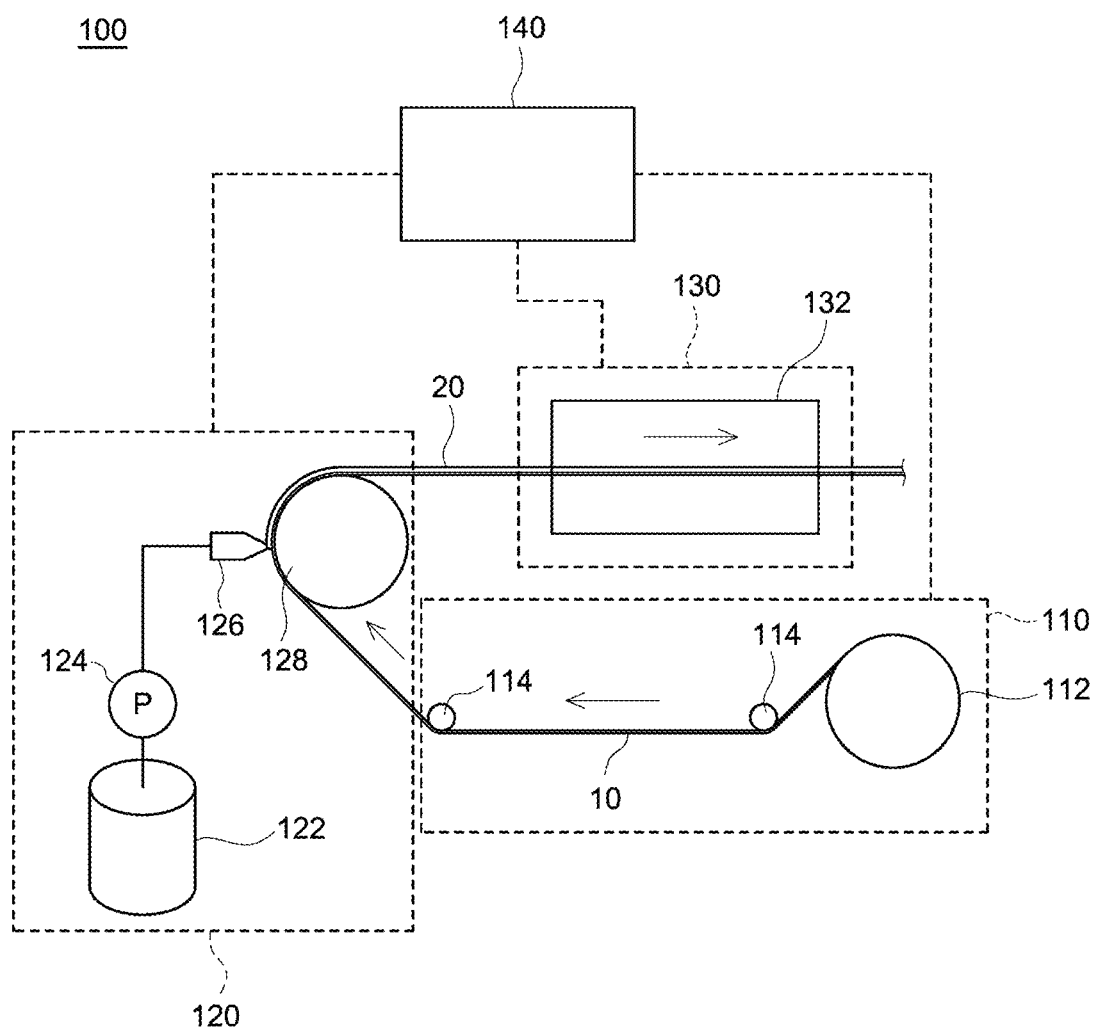
FIG. 4 is a diagram illustrating schematically an electrode production apparatus according to an embodiment.

The art disclosed herein provides an electrode production apparatus for producing an electrode. FIG. 4 is a diagram illustrating schematically an electrode production apparatus 100 according to an embodiment. The electrode production apparatus 100 can be suitably used in order to produce an electrode (positive electrode) for positive polarity, and an electrode (negative electrode) for negative polarity, in a nonaqueous electrolyte secondary battery (typically a lithium ion secondary battery). As illustrated in FIG. 4, the electrode production apparatus 100 is provided with a transport unit 110, a coating unit 120, a drying unit 130 and a control unit 140. The foregoing are arranged sequentially along a preset transport path. The control unit 140 is electrically connected to, and controls, the transport unit 110, the coating unit 120 and the drying unit 130. In the electrode production apparatus 100 illustrated in FIG. 1 typically an electrode mix paste is applied on an elongated collector 10 while the collector 10 is transported along the longitudinal direction, and the solvent is removed through drying, to thereby form an electrode mix layer. The arrows in FIGS. 4 to 6 denote the transport direction. The various structures will be explained next.

The control unit 140 is made up for instance of a microcomputer. The hardware configuration of the microcomputer is not particularly limited. Although not limited thereto, the hardware configuration of the microcomputer includes for instance an interface that allows transmitting and receiving data to/from an external device, a central processing unit (CPU) for executing instructions of a control program, a ROM (read-only memory) that stores a program executed by the CPU, a RAM (random access memory) that is used as a working area in which programs are run, and a storage unit, such as a memory, in which the above programs and various data are stored.

The transport unit 110 transports the collector 10 along a transport path. The transport unit 110 has for instance a collector supply device 112 for supplying the collector 10, and a plurality of transport guides 114. In the collector supply device 112, the elongated collector 10 is arranged beforehand wound around a winding core; a predetermined amount of the collector 10 is then supplied, from the collector supply device 112, as a result of control by the control unit 140. A material of good conductivity and that is present stably in the interior of the battery is used as the collector 10; herein, demands placed on the collector material include being lightweight, having the required mechanical strength, and being easy to process. Preferably, metal foils made up of the above-described metals (for instance copper or aluminum) of good conductivity are preferably used as such a material.

The transport unit 110 may have a tension control mechanism for adjusting tension so that the collector 10 is acted upon by a predetermined tension. Examples of such a tension control mechanism include an automatic tension control device of dancer roll type. The transport unit 110 may be provided with a position adjustment mechanism for adjusting the position of the collector 10 in the width direction. Examples of the position adjustment mechanism include for instance a so-called EPC (edge position controller) which is a combination of an edge inspection device (edge sensor) and a position correction device (position controller). The tension control mechanism and the position adjustment mechanism described above are for instance electrically connected to, and controlled by, the control unit 140.

The devices and control configuration of the transport unit 110 may be similar to those of conventional transport units, and are not characterizing features of the present disclosure; accordingly, a detailed explanation thereof will be omitted herein.

The coating unit 120 applies an electrode mix paste onto the collector 10. The coating unit 120 has for instance a storage tank 122, a pump 124, a coating device 126 and a backup roll 128. The storage tank 122 is a tank for storing the electrode mix paste produced as described above. The inner wall of the storage tank 122 is preferably of a material having excellent corrosion resistance against the electrode mix paste that is stored. Examples of such a material include stainless steel. The pump 124 is a device for feeding the electrode mix paste from the storage tank 122 to the coating device 126. The pump 124 is connected to the storage tank 122 by a pipe. The electrode mix paste stored in the storage tank 122 is sucked up from the discharge port of the storage tank 122 at a constant flow rate, and is fed to the coating device 126, by the pump 124. The coating device 126 is a device for applying the electrode mix paste onto the collector 10. For instance a conventionally known device such as a slit coater, a gravure coater, a die coater or a comma coater can be used as the coating device 126. The backup roll 128 is a roller that is arranged along the transport path and supports the collector 10.

In the example illustrated in FIG. 4, a die coater is used as the coating device 126. The collector 10 is transported along the transport path and is supported by the backup roll 128. Through control by the control unit 140, for instance the coating device 126 can continuously apply the electrode mix paste onto the collector 10 to a predetermined basis weight and thickness.

Besides the devices described above, the coating unit 120 may include as appropriate devices that are used in this type of coating device. For instance a filtration device for removing foreign matter (for example metallic foreign matter) in the electrode mix paste may be provided between the pump 124 and the coating device 126.

Figure 5:
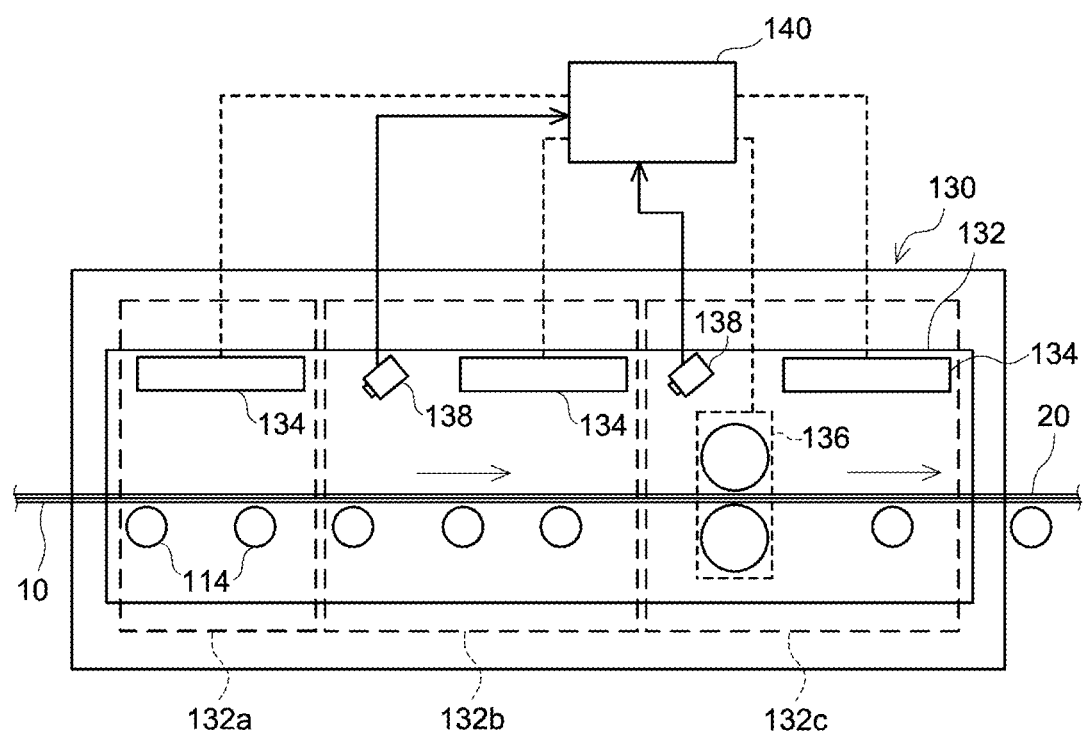
FIG. 5 is a diagram illustrating schematically a drying unit provided in an electrode production apparatus according to an embodiment.

The coating film 20 made up of the electrode mix paste is dried, in the drying unit 130, to thereby form an electrode mix layer on the collector 10. As illustrated in FIG. 5, the drying unit 130 includes for instance a drying oven 132, heating heaters 134, a pressing device 136 and temperature measuring devices 138. The drying oven 132 has, from the upstream side of the transport direction, a residual heat period 132a in which the coating film temperature is raised up to the evaporation temperature (volatilization temperature) of the solvent, a constant rate drying period 132b at which the coating film temperature is kept constant, and a falling rate drying period 132c in which the coating film temperature is raised again, after the constant rate drying period.

The heating method in the drying oven 132 is not particularly limited so long as the drying oven 132 has the above-three periods (stages), and for instance a conventionally known device such as a hot air drying oven or an infrared drying oven can be used herein. The heating heaters 134 are heat sources, for instance devices that blow heated gas, in a case where the drying oven 132 is a hot air drying oven. Herein the gas blown from the heating heaters 134 is not particularly limited, and may be an inert gas such as nitrogen gas or helium gas. The pressing device 136 is a device for pressing the coating film 20, in the falling rate drying period 132c. The temperature measuring devices 138 is a device for measuring the coating film temperature in the interior of the drying oven 132. As denoted by the dashed lines in FIG. 5, the heating heaters 134, the pressing device 136 and the temperature measuring devices 138 are electrically connected to the control unit 140.

The drying temperature of the drying oven 132 (temperature within the drying oven) may be identical, or dissimilar, between the residual heat period 132a, the constant rate drying period 132b and the falling rate drying period 132c. For instance, the coating film temperature can be measured continuously by the temperature measuring devices 138, whereupon the control unit 140 controls the heating heaters 134 on the basis of the measured values. From the viewpoint of improving productivity, the drying temperature (temperature within the drying oven) is preferably set to be 50° C. or higher, more preferably for instance 80° C. or higher, and yet more preferably 100° C. or higher. For instance the drying temperature may be set to be 120° C. or higher, for instance 140° C. or higher, in a case where a solvent having a comparatively high boiling point is used (for instance an aqueous solvent). From the viewpoint of preventing cracking of the coating film and preventing oxidation of the collector 10 (metal foil), the upper limit of the drying temperature (temperature within the drying oven) is preferably set to be 200° C. or lower, more preferably 190° C. or lower, and yet more preferably 180° C. or lower.

Depending on the type of the solid material 22 and the solvent 24 contained in the coating film 20, and the conditions in the drying oven 132, the coating film temperature of the coating film 20 may be excessively lower or excessively higher than a desired temperature, at respective positions in the periods. As described above, therefore, the coating film temperature is continuously measured by the temperature measuring devices 138, and the heating heaters 134 is controlled by the control unit 140 on the basis of the measured value. Specifically, the state of the coating film at the falling rate drying period 132c can be stabilized by raising the temperature of the heating heaters 134 disposed in the constant rate drying period 132b, in a case where the coating film temperature is excessively low, and by lowering the temperature of the heating heaters 134 disposed in the constant rate drying period 132b, in a case where the coating film temperature is excessively high, at a predetermined position (for instance the temperature measuring devices 138 on the upstream side).

The transport speed of the transport unit 110 in the drying oven 132 may be the same or dissimilar between the residual heat period 132a, the constant rate drying period 132b and the falling rate drying period 132c. In a preferred implementation, the transport speed is set to be kept substantially constant (for instance set transport speed of ±0.1 m/min) in the three sections. From the viewpoint of preventing cracking in the coating film, the transport speed is preferably set to 100 m/min or lower, more preferably 90 m/min or lower, and yet more preferably 80 m/min or lower. From the viewpoint of production costs, the transport speed is preferably 0.1 m/min or higher, more preferably 0.5 m/min or higher.

The form of the pressing device 136 is not particularly limited, so long as it is a device that allows pressing the coating film 20 under the above-described range of conditions. For instance pressing may be accomplished using a roll rolling machine, or using a flat rolling machine. In the example illustrated in FIG. 5, the coating film 20 is pressed by causing the collector 10 and the coating film 20 to pass between vertically arrayed rolls. In a case where the pressing device 136 is a roll rolling machine, the diameter of the rolls is preferably from 20 mm to 60 mm, more preferably from 30 mm to 50 mm.

Pressing by the pressing device 136 is adjusted so that the thickness of the coating film 20 after pressing is not lower than 80% relative to 100% as the film thickness of the coating film 20 prior to pressing. The linear pressure in a concrete roll rolling machine varies depending on the materials of the positive electrode active material contained in the coating film 20 and on the drying state of the coating film 20, and accordingly is not particularly limited, but is for instance 0.1 kN/cm (about 10 kg/cm) or less. This pressing is carried out within the drying oven 132, and is distinct from pressing in the general pressing step that is carried out after the drying step. The linear pressure of the roll rolling machine used in the pressing step is typically 10 kN/cm (about 1000 kg/cm) or higher.

Figure 6:
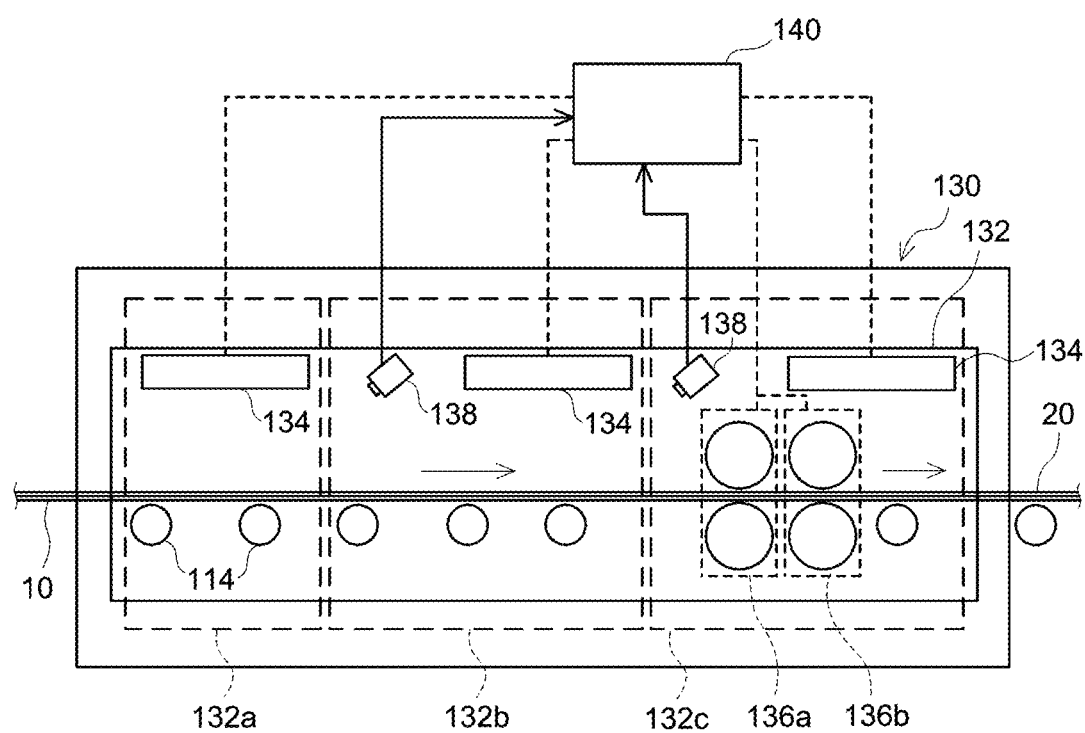
FIG. 6 is a diagram illustrating schematically a drying unit provided in an electrode production apparatus according to another embodiment.

As illustrated in FIG. 6, a plurality of pressing devices 136 (herein pressing devices 136a, 136b) may be provided, in the transport direction, in the falling rate drying period 132c. In a case where the pressing device 136 is provided in the form of a plurality thereof, the pressing pressures in the pressing devices 136a, 136b may be of identical or dissimilar magnitude. The pressing pressure in the pressing devices 136a disposed upstream in the transport direction may be set to be higher than that of the pressing device 136b disposed downstream in the transport direction. Such a configuration allows preventing more suitably shrinkage of the coating film.

In the example illustrated in FIG. 5, two pressing devices 136 are provided, but there may be provided two or more pressing devices 136.

In a case where the pressing device 136 is provided in the form of a plurality thereof, pressing may be set to be carried out by a more optimal pressing device 136 alone. For instance pressing may be carried out by just the pressing device 136a illustrated in FIG. 6, or just by the pressing device 136b alone. Such pressing may be performed through control by the control unit 140 in accordance with the coating film temperature measured by the temperature measuring devices 138.

Through drying of the collector 10 coated with the electrode mix paste, using such a drying unit 130, the solvent is removed, through evaporation (volatilization), from the paste (coating film) on the collector 10. This allows producing an electrode provided with an electrode mix layer on the collector 10.

The method for producing the electrode and the electrode production apparatus disclosed herein allow thus producing a high-quality electrode mix efficiently. The electrode thus produced is made up of a coating film that is thicker than conventional ones, and is thus advantageous in terms of exhibiting accordingly higher capacity. Therefore a high-capacity secondary battery can be obtained when using the above electrode to construct a secondary battery.

The electrode produced as described above can be used to produce a nonaqueous electrolyte secondary battery. A configuration example of a nonaqueous electrolyte secondary battery produced using electrodes obtained in accordance with the production method disclosed herein will be explained next with reference to FIGS. 7 and 8.

In the embodiment below an example of a lithium ion secondary battery provided with a wound electrode body will be explained in detail, but the present disclosure is not meant to be limited to such an embodiment. For instance also a multilayer-structure electrode body having a multilayer structure resulting from alternate overlaying of a positive electrode sheet and a negative electrode sheet, across an interposed separator, is preferably adopted herein.

Figure 7:
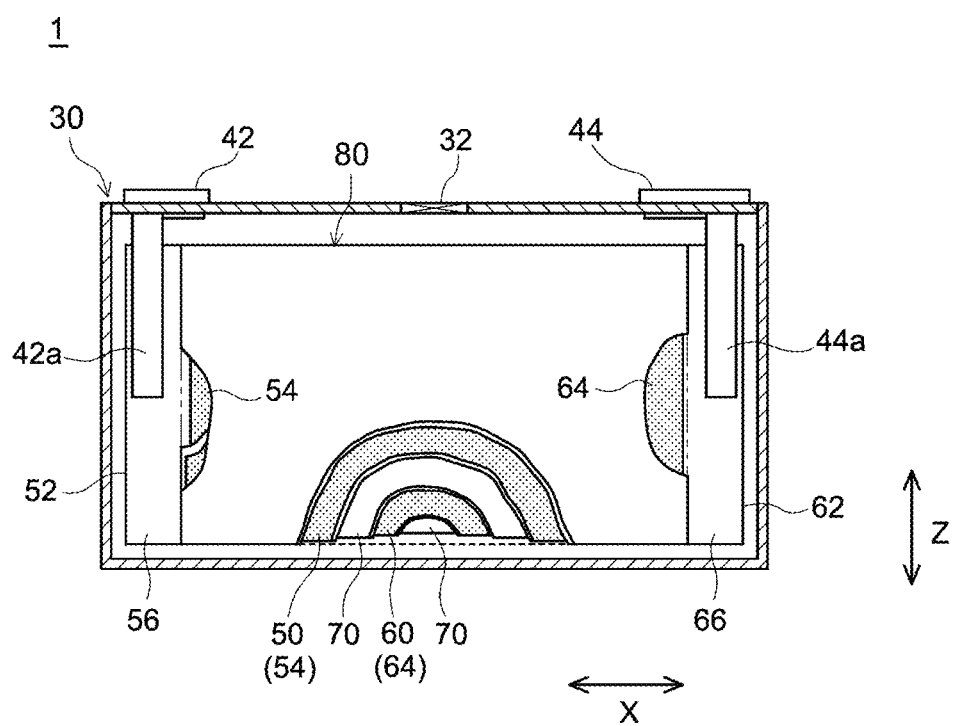
FIG. 7 is a longitudinal cross-sectional diagram illustrating schematically a nonaqueous electrolyte secondary battery according to an embodiment.

A nonaqueous electrolyte secondary battery 1 illustrated in FIG. 7 is constructed by accommodating a flat wound electrode body 80 and a nonaqueous electrolyte solution (not shown) in a sealable box-shaped battery case 30. The battery case 30 is provided with a positive electrode terminal 42 and a negative electrode terminal 44 for external connection, and with a thin-walled safety valve 32 configured to relieve internal pressure in the battery case 30 when the internal pressure rises to or above a predetermined level. A filling port (not shown) for injecting a nonaqueous electrolyte solution is provided in the battery case 30. The positive electrode terminal 42 and the positive electrode collector plate 42a are electrically connected to each other. The negative electrode terminal 44 and the negative electrode collector plate 44a are electrically connected to each other. The material of the battery case 30 is preferably a high-strength, lightweight metallic material of good thermal conductivity; examples of such metallic material include for instance aluminum and steel.

Figure 8:
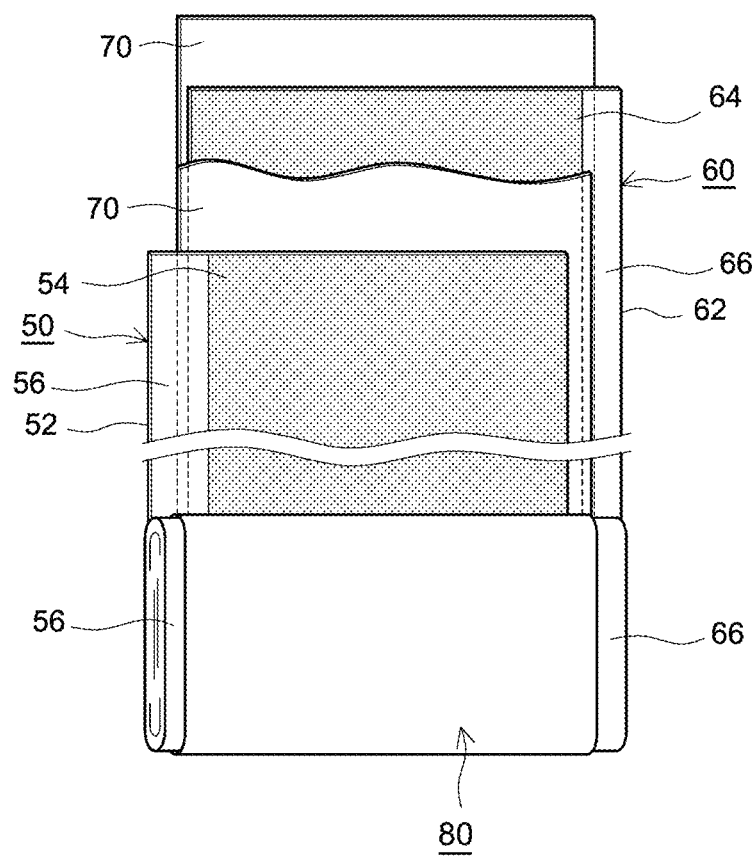
FIG. 8 is a diagram illustrating schematically the configuration of a wound electrode body in a nonaqueous electrolyte secondary battery according to an embodiment.

As illustrated in FIGS. 7 and 8, the wound electrode body 80 has a form in which the elongated sheet-shaped positive electrode 50 and the elongated sheet-shaped negative electrode 60 are superimposed on each other across elongated sheet-shaped separators 70, and the resulting stack is wound in the longitudinal direction. The positive electrode 50 has a configuration in which a positive electrode mix layer 54 is formed, in the longitudinal direction, on one or both faces of an elongated sheet-shaped positive electrode collector 52. The negative electrode 60 has a configuration in which a negative electrode mix layer 64 is formed, in the longitudinal direction, on one or both faces of an elongated sheet-shaped negative electrode collector 62. At one edge portion of the positive electrode collector 52 in the width direction there is provided a portion (i.e. positive electrode collector exposed portion 56) in which the positive electrode mix layer 54 is not formed and the positive electrode collector 52 is exposed, along that edge portion. At the other edge portion of the negative electrode collector 62 in the width direction there is provided a portion (i.e. negative electrode collector exposed portion 66) in which the negative electrode mix layer 64 is not formed and the negative electrode collector 62 is exposed, along that edge portion. A positive electrode collector plate 42a and a negative electrode collector plate 44a are respectively joined to the positive electrode collector exposed portion 56 and the negative electrode collector exposed portion 66.

A positive electrode 50 and a negative electrode 60 obtained in accordance with the production method described above are used as the positive electrode 50 and the negative electrode 60. In the present configuration example, a respective electrode mix layer (positive electrode mix layer 54 or negative electrode mix layer 64) is formed, in the positive electrode 50 and the negative electrode 60, on either face of the collector 10 (positive electrode collector 52 or negative electrode collector 62).

Examples of the separator 70 include a porous sheet (film) made up of a resin such as polyethylene (PE), polypropylene (PP), polyester, cellulose, polyamide or the like. Such a porous sheet may have a single-layer structure or a multi-layer structure of two or more layers (for instance a three-layer structure in which PP layers are laid up on both faces of a PE layer). A heat resistant layer (HRL) may be provided on the separator 70.

A nonaqueous electrolyte solution similar to those of conventional lithium ion secondary batteries, typically containing a supporting salt in an organic solvent (nonaqueous solvent), can be used herein as the nonaqueous electrolyte solution. Organic solvents such as carbonates, esters, ethers, nitriles, sulfones and lactones can be used, without particular limitations, as the nonaqueous solvent. Specifically, for instance a nonaqueous solvent such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) or trifluorodimethyl carbonate (TFDMC) can be preferably used herein. A single type of solvent, or two or more types in appropriate combinations, can be used herein as such a nonaqueous solvent. A lithium salt such as $LiPF_6$, $LiBF_4$, $LiClO_4$ or the like can be used as the supporting salt. The concentration of the supporting salt is not particularly limited, but is preferably from about 0.7 mol/L to 1.3 mol/L.

So long as the effect of the present disclosure is not significantly impaired thereby, the above nonaqueous electrolyte solution may contain various additives, for instance gas generating agents; coating film-forming agents; dispersants; and thickeners.

The nonaqueous electrolyte secondary battery 1 having the above configuration can be used in various applications. Suitable examples of applications include drive power sources mounted on vehicles such as battery electric vehicles (BEV), hybrid electric vehicles (HEV), and plug-in hybrid electric vehicles (PHEV). The nonaqueous electrolyte secondary battery 1 can be used in a form where multiple nonaqueous electrolyte secondary batteries 1 are connected in series and/or in parallel.

Examples pertaining to the present disclosure will be explained below, but the present disclosure is not meant to be limited to the features illustrated in the examples.

Firstly, a paste was obtained through mixing of N-methyl-2-pyrrolidone (NMP) as a solvent, acetylene black (AB) as a conductive material and polyvinylidene fluoride (PVdF) as a binder, in a disperser. Then $LiFePO_4$ (LFP) as a positive electrode active material was mixed with the paste, to prepare a positive electrode mix paste. The positive electrode mix paste was adjusted to LFP:AB:PVdF=91.4:4.6:4 (mass ratio).

The positive electrode mix paste was applied on an aluminum foil as a positive electrode collector, to a thickness of 500 μm.

The positive electrode collector coated with the paste was placed in a hot air drying oven at 120° C. (transport speed 1 m/min), to remove the solvent by drying. As a result there was prepared a positive electrode (Comparative example 1) having a positive electrode mix layer on the surface of one face of the positive electrode collector.

A positive electrode collector coated with the above paste was prepared in the same manner. The positive electrode collector coated with the paste was placed in a hot air drying oven at 120° C. (transport speed 1 m/min), and was pressed by a pressing device provided in the falling rate drying period within the hot air drying oven. A roll rolling machine with vertically arrayed rolls ((φ40) was used herein as the pressing device, and a pressing operation was carried out once, at a linear pressure of 0.002 kN/cm (about 0.2 kg/cm). The solids ratio of the positive electrode mix paste (coating film) at the time of pressing under these conditions was 80 mass %. As a result a positive electrode (Example 1) was prepared that had a positive electrode mix layer on the surface of one face of a positive electrode collector.

Electrode Quality Evaluation

The state of each coating film (occurrence or absence of collector curving) in Example 1 and Comparative example 1 was visually evaluated. Further, the area ratio of cracks in the coating film after drying, the thickness of the coating film after drying, and the packing ratio of the electrode after drying were worked out; the results are given in Table 1.

The coating film surface after drying was observed using a laser microscope, and the surface area of the cracks was calculated, to work out the area ratio of drying cracks in the coating film after drying. The area ratio of such cracks in the coating film after drying was determined by dividing the surface area of the cracks by the surface area of the entire coating film. The results are given in Table 1.

The packing ratio of the electrode after drying denotes a value obtained by dividing true electrode density by apparent electrode density, and multiplying the result by 100. The true electrode density is a value calculated on the basis of the density and content ratio of constituent components. The apparent electrode density is a value obtained by dividing the mass (g) of the electrode (coating film after drying) by the apparent volume ($cm^3$) of the electrode (coating film after drying). The plan-view surface area ($cm^2$) and thickness (cm) in Example 1 and Comparative example 1 were measured, and the obtained values were multiplied, to thereby calculate the apparent volume.

TABLE 1

|  | Area ratio of cracks in coating film after drying (%) | Thickness of coating film after drying (μm) | Packing ratio of electrode after drying (%) |
| --- | --- | --- | --- |
| Example 1 | 0 | 330 | 38 |
| Comp. example 1 | 0.4 | 333 | 36 |

The coating films were dried, without curving of the collector, and film thickness was uniform. As Table 1 reveals, it is found that pressing by the pressing device is performed under conditions whereby the film thickness in Example 1 is not lower than 80%, relative to 100% as the film thickness in Comparative example 1. It is also found that cracks did not occur in the coating film (electrode) after drying, in Example 1 where pressing was carried out in the falling rate drying period. The electrode production method and electrode production apparatus disclosed herein allow realizing production of a high-quality electrode in which film thickness is maintained uniformly, and in which cracking of a coating film (electrode) is suppressed.

As Table 1 reveals, an electrode packing ratio in Example 1 is higher than the electrode packing ratio in Comparative example 1. That is, it is considered that electrode energy density in Example 1 is higher than that in Comparative example 1.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A method for producing an electrode for nonaqueous electrolyte secondary batteries, the method comprising:
   - a step of preparing an electrode mix paste that contains at least an active material and a solvent;
   - a step of applying the electrode mix paste onto a collector;
   - a step of drying a coating film made up of the electrode mix paste applied on the collector, wherein the coating film is placed in a drying oven and a temperature in the drying oven is controlled to be constant;
   - a step of continuously measuring a temperature of the coating film during performing of the drying step;
   - a step of first pressing the coating film while the temperature of the coating film rises after the temperature of the coating film becomes constant at an evaporation temperature of the solvent during the measuring step, and the first pressing is performed at a pressure of 0.1 kN/cm or less; and
   - a step of second pressing the coating film after the drying step;

wherein
   - in the step of applying the electrode mix paste, applying is performed so that an average film thickness of the coating film at a time of applying the electrode mix paste is from 200 mm to 600 μm,
   - the first pressing is carried out under conditions such that a film thickness of the coating film is not lower than 80% relative to 100% as the film thickness prior to the first pressing, and
   - the second pressing is carried out under conditions such that a film thickness of an electrode mix layer is 70% or less relative to 100% as the film thickness of the electrode mix layer prior to the second pressing step.

2. The method for producing the electrode of claim 1, wherein the first pressing is carried out under conditions such that the film thickness of the coating film is thinned by 0.1% to 10% relative to 100% as the film thickness prior to the pressing.

3. The method for producing the electrode of claim 1, wherein the first pressing is carried out a plurality of times while the temperature of the coating film rises after the temperature of the coating film becomes constant at an evaporation temperature of the solvent during the measuring step.

* * * * *